Oct. 22, 1946.  F. E. REINHARDT  2,409,705
FILTER LEAF
Filed Sept. 19, 1945
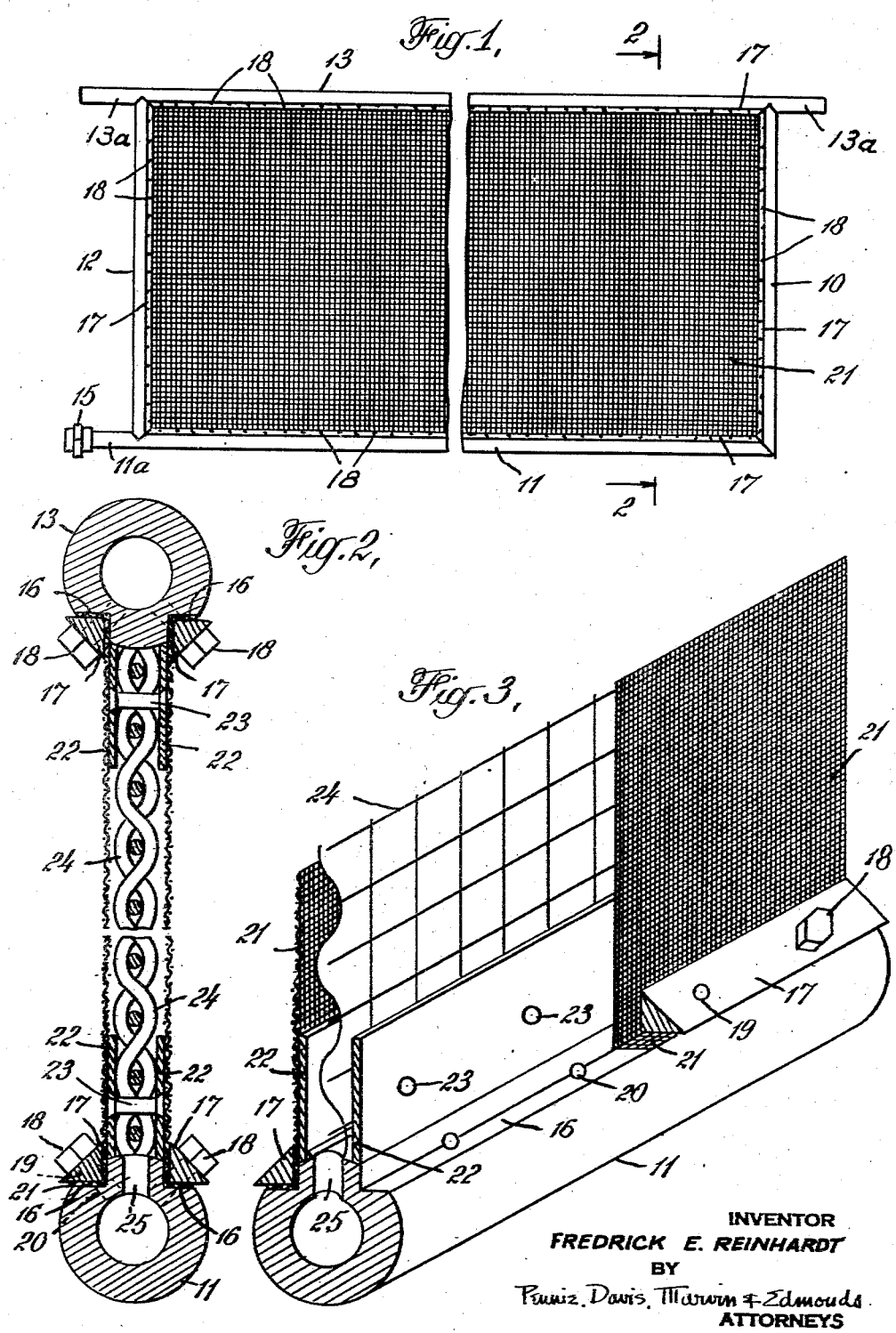
INVENTOR
FREDRICK E. REINHARDT
BY
Penrie, Davis, Marvin & Edmonds
ATTORNEYS

UNITED STATES PATENT OFFICE 2,409,705

FILTER LEAF

Fredrick E. Reinhardt, Bellflower, Calif., assignor to Richfield Oil Corporation, Los Angeles, Calif., a corporation of Delaware Application September 19, 1945, Serial No. 617,290

1 Claim. (Cl. 210—195)

This invention relates to improvements in filter leaves used in discontinuous, stationary, leaf-type filters.

Filter leaves of the type improved by my invention comprise a section of heavy, coarse-mesh wire screening spaced between two sections of light, fine-mesh wire screening, constituting the filtering medium, the edges of the three sections of screening being fastened to a common frame member formed of metal piping or tubing. In use, one or a plurality of the leaves is submerged in the material to be filtered. The leaves may be of different sizes where more than one leaf is employed, and may be confined within a press. A vacuum may be created within each individual leaf structure to cause flow through the wire filtering medium, or, alternatively, a positive pressure may be employed to cause the flow, or the flow may result from the use of both vacuum and pressure. In any event, as the filtration proceeds, the solid phase of the material being filtered is deposited on the outside of the fine-mesh wire screening, while the liquid component or filtrate passes into the leaf structure and thence through drainage apertures in the frame member to a conduit, with which the frame member is connected, extending to a receiver or collector. After a predetermined thickness of cake has accumulated on the filtering medium, the leaf is usually withdrawn for removal of the cake, but in some cases it is practicable to shut off the flow of feed to the filter and, after first draining the filter, to remove the cake by the expedient of a reverse flow of liquid, usually water, through the leaf.

In the conventional leaf, the fine-mesh screens are secured to the frame member by soldering the edges of the screens in slots cut in the frame member. The replacement of the screens, frequently necessary as they are subject to rupture, has proved to be very time-consuming and troublesome. Since a torch must be used to melt the solder securing the screen to be replaced to the frame and in soldering-in the new screen, the work must be done at a location remote from the filter house when inflammable materials are being handled therein. Also, an exceedingly high degree of care is required if plugging of the drainage apertures in the frame member with solder is to be avoided.

A principal object of the present invention is to provide a leaf structure of the type described, characterized in that the fine-mesh wire screens may be replaced with a minimum of inconvenience.

The present invention whereby the stated object is achieved will be described with the aid of the accompanying drawing, in which like numerals denote like parts, and in which Fig. 1 is a broken elevation of a leaf structure embodying my invention, Fig. 2 is a section taken on the line 2—2 of Fig. 1, and, Fig. 3 is a sectional isometric view.

Referring to the drawing, Fig. 1 in particular, the numerals 10, 11, 12 and 13 denote a rectangular frame member formed as of four sections of iron piping suitably joined, as by welding. Extensions 13a of the upper pipe section 13 serve to support the leaf within a vessel into which material to be filtered is introduced. Lower pipe section 11 comprises an extension 11a, having associated therewith a union 15 for coupling the lower pipe section with a line, not shown, extending to a filtrate receiver, not shown.

Pipe sections 10—13 comprise parallel grooves 16 (Figs. 2 and 3), complementary with respect to lock bars 17. Screws 18 extending through apertures 19 in lock bars 17 and into threaded holes 20 in the grooves 16, serve with the lock bars to secure fine-mesh wire screens 21 to the pipe sections. If desired, suitable washers may be interposed between the heads of screws 18 and the lock bars. Secured to each pipe section, preferably by welding at least one of them thereto, are plates 22 joined together by rivets 23, or the functional equivalent, passing through coarse-mesh screen 24, which is thus secured to the frame members. The primary purpose of coarse-mesh wire screen is to maintain fine-mesh wire screens 18 in spaced relation during use of the leaf in a filtration operation.

Lower pipe section or header pipe 11, in addition to parallel grooves 16 and threaded bore holes 20, comprises, spaced along its top portion within the leaf structure, passageways or apertures 25 which allow for drainage of filtrate from within the leaf structure. Flow of filtrate in the lower pipe section is toward the union 15 by means of which the lower pipe section is joined to the connection extending to the receiver for the filtrate.

It will be immediately seen that removal and replacement of the fine-mesh wire screens when these are secured to the frame according to the invention is very simple and that the operation is one which can be quickly performed, even by an unskilled worker. My invention is further advantageous in that its utilization does away with the necessity of carrying a large number of stand-by leaves in stock.

I claim:

In a filter leaf for discontinuous, stationary leaf type filters comprising a frame carrying two fine mesh wire screens constituting the filtering medium and a coarse-mesh wire separator screen mediate the fine-mesh wire screens, parallel grooves around the inside of the frame, locking elements having surfaces complementary with respect to the grooves and co-acting therewith to secure the fine-mesh wire screens to the frame, parallel plates around the inside of the frame between the grooves, and means joining the plates and passing through the coarse-mesh wire screen to secure it to the frame.

FREDRICK E. REINHARDT.